(12) United States Patent
Stineman, Jr.

(10) Patent No.: US 7,702,302 B1
(45) Date of Patent: Apr. 20, 2010

(54) COMBINATION OF HIGH-SIDE AND LOW-SIDE CURRENT CONTROL IN SYSTEM FOR PROVIDING POWER OVER COMMUNICATION LINK

(75) Inventor: John Arthur Stineman, Jr., Carpinteria, CA (US)

(73) Assignee: Linear Technology Corporation, Milpitas, CA (US)

( * ) Notice: Subject to any disclaimer, the term of this patent is extended or adjusted under 35 U.S.C. 154(b) by 849 days.

(21) Appl. No.: 11/506,779

(22) Filed: Aug. 21, 2006

Related U.S. Application Data

(60) Provisional application No. 60/749,048, filed on Dec. 12, 2005.

(51) Int. Cl.
H01Q 11/12 (2006.01)
H04B 1/38 (2006.01)

(52) U.S. Cl. .................. 455/127.1; 455/572

(58) Field of Classification Search .......... 455/572, 455/127
See application file for complete search history.

(56) References Cited

U.S. PATENT DOCUMENTS

| | | | |
|---|---|---|---|
| 6,473,608 B1 | 10/2002 | Lehr et al. | |
| 6,531,899 B1 * | 3/2003 | Male | 327/100 |
| 2003/0146765 A1 | 8/2003 | Darshan et al. | |
| 2004/0073597 A1 | 4/2004 | Caveney et al. | |
| 2004/0164619 A1 | 8/2004 | Parker et al. | |
| 2004/0227522 A1 * | 11/2004 | Male | 324/524 |
| 2005/0078422 A1 * | 4/2005 | Pincu et al. | 361/62 |
| 2005/0080516 A1 | 4/2005 | Pincu et al. | |

OTHER PUBLICATIONS

International Search Report and Written Opinion issued in corresponding International Patent Application No. PCT/US2006/039273, mailed Feb. 20, 2007.

International Search Report and Written Opinion issued in corresponding International Patent Application No. PCT/US2006/043547, mailed Mar. 2, 2007.

IEEE Computer Society: 802.3af, "Part 3: Carrier Sense Multiple Access with Collision Detection (CSMA/CD) Access Method and Physical Layer Specifications Amendment: Data Terminal Equipment (DTE) Power via Media Dependent Interface (MDI)," IEEE Standards, Jun. 18, 2003, p. 1-121, The Institute of Electrical and Electronics Engineers, Inc, New York, New York.

Rohrmoser, M. et al., "Digital Connect ME Technical Product Specification," Jul. 2003, p. 1-7, UK, URL: http://www.entrix.co.uk/connect/data/digiConnectME_techprdspec.pdf.

(Continued)

*Primary Examiner*—Vincent P Harper
*Assistant Examiner*—Omoniyi A Obayanju
(74) *Attorney, Agent, or Firm*—McDermott Will & Emery LLP

(57) ABSTRACT

A novel system for supplying power to a powered device over a communication link, such as an Ethernet link, has a current control mechanism that combines low-side current control circuitry with high-side current control circuitry. The low-side current control circuitry is coupled to a low-side power supply line for controlling low-side current flowing in the low-side power supply line. The high-side current control circuitry is coupled to a high-side power supply line for controlling high-side current in the high-side power supply line.

23 Claims, 2 Drawing Sheets

OTHER PUBLICATIONS

"IntelliJack Switch Produktreihe," Aug. 2003, p. 1-4, URL: www.3com.de/pdf/intel_switch.pdf.

International Preliminary Report on Patentability and Written Opinion of the International Searching Authoritty issued in corresponding International Patent Application No. PCT/US2006/045241, mailed Jun. 26, 2008.

Linear Technology, "LTC4259A, Quad IEEE 802.3af Power over Ethernet Controller with AC Disconnect" [Online, http://www.chipcatalog.com/Linear/LTC4259A.htm] 2003, pp. 1-32.

International Search Report for Corresponding Application No. PCT/US2006/045242 Mailed Mar. 14, 2007.

Cisco Systems, "Power over Ethernet: Cisco Inline Power and IEEE 802.3af" [Online, http://www.cisco.com/warp/public/cc/so/neso/bbssp/poeie_wp.pdf] 2004, pp. 1-13.

International Search Report for Corresponding Application No. PCT/US2006/047218 Mailed Apr. 5, 2007.

International Search Report and Written Opinion of the International Search Authority, issued in corresponding International Patent Application No. PCT/US2006/045241, Mailed on Jun. 19, 2007.

* cited by examiner

COMBINATION OF HIGH-SIDE AND LOW-SIDE CURRENT CONTROL IN SYSTEM FOR PROVIDING POWER OVER COMMUNICATION LINK

This application claims priority of provisional U.S. patent application No. 60/749,048 filed on Dec. 12, 2005, and entitled "SYSTEM AND METHOD FOR SUPPORTING ADVANCED POWER OVER ETHERNET SYSTEM."

TECHNICAL FIELD

This disclosure relates to power supply systems, and more particularly, to circuitry and methodology for combining high-side and low-side current control in a system for providing power over a communication link, such as a Power over Ethernet (PoE) system.

BACKGROUND ART

Over the years, Ethernet has become the most commonly used method for local area networking. The IEEE 802.3 group, the originator of the Ethernet standard, has developed an extension to the standard, known as IEEE 802.3af, that defines supplying power over Ethernet cabling. The IEEE 802.3af standard defines a Power over Ethernet (PoE) system that involves delivering power over unshielded twisted-pair wiring from a Power Sourcing Equipment (PSE) to a Powered Device (PD) located at opposite sides of a link. Traditionally, network devices such as IP phones, wireless LAN access points, personal computers and Web cameras have required two connections: one to a LAN and another to a power supply system. The PoE system eliminates the need for additional outlets and wiring to supply power to network devices. Instead, power is supplied over Ethernet cabling used for data transmission.

As defined in the IEEE 802.3af standard, PSE and PD are non-data entities allowing network devices to supply and draw power using the same generic cabling as is used for data transmission. A PSE is the equipment electrically specified at the point of the physical connection to the cabling, that provides the power to a link. A PSE is typically associated with an Ethernet switch, router, hub or other network switching equipment or midspan device. A PD is a device that is either drawing power or requesting power. PDs may be associated with such devices as digital IP telephones, wireless network access points, PDA or notebook computer docking stations, cell phone chargers and HVAC thermostats.

The main functions of the PSE are to search the link for a PD requesting power, optionally classify the PD, supply power to the link if a PD is detected, monitor the power on the link, and disconnect power when it is no longer requested or required. A PD participates in the PD detection procedure by presenting a PoE detection signature defined by the IEEE 802.3af standard.

If the detection signature is valid, the PD has an option of presenting a classification signature to the PSE to indicate how much power it will draw when powered up. Based on the determined class of the PD, the PSE applies the required power to the PD.

In typical 802.3af PoE application, a PSE has active current control in a low-side power supply line between the PSE port and a more negative power supply lead of a pair of power supply leads. This current control provides functions of current limiting and circuit breaking. To meet safety requirements, a fuse or positive temperature coefficient (PTC) device is conventionally used in a high-side power supply line between the PSE port and a more positive power supply lead of the pair of power supply leads, to protect against excessive current in the event of failure of the low-side current limiting.

The problem with this configuration is that over a large temperature range, the fusing current of the fuse or PTC device varies greatly. The fuse or PTC device must guarantee fusing at the current mandated by safety standards when the ambient temperature is very cold. The current that this device can reliably carry without fusing at a high ambient temperature is significantly less.

To support high-power PoE systems, current levels in a PoE should be increased. When current levels are increased, the margin between the fuse current and the safe operating current is reduced to a point at which it is difficult to guarantee maintaining proper fuse operation over a large temperature range.

Therefore, it would be desirable to create an advanced current control mechanism that would reliably support high-power PoE operations over a large temperature range.

SUMMARY OF THE DISCLOSURE

The present disclosure offers a novel system and methodology for supplying power to a powered device over a communication link, such as an Ethernet link. In particular, the system of the present disclosure comprises a power supply device for delivering power to an output port coupled to the communication link. A low-side power supply line is provided between the output port and a more negative power supply lead of a pair of leads that supply power to the power supply device. A high-side power supply line is provided between the output port and a more positive power supply lead of the pair of power supply leads.

A current control mechanism of the power supply device combines low-side current control circuitry with high-side current control circuitry. The low-side current control circuitry is coupled to the low-side power supply line for controlling low-side current flowing in the low-side power supply line. The high-side current control circuitry is coupled to the high-side power supply line for controlling high-side current in the high-side power supply line.

The high-side current control circuit may include a high-side current limiting circuit for limiting the high-side current to a first prescribed value, and/or a high-side circuit breaker for disconnecting the more positive power supply lead from the output port in response to a predetermined event. For example, the high-side circuit breaker may disconnect the more positive power supply lead from the output port when the high-side current exceeds a second prescribed value.

The low-side side current control circuit may include a low-side current limiting circuit for limiting the low-side current to the first prescribed value, and/or a low-side circuit breaker for disconnecting the more negative power supply lead from the output port when the low-side current exceeds the second prescribed value.

The high-side power supply line may include a high-side impedance for sensing the high-side current, and a high-side transistor device controlled by the high-side current control circuitry. The transistor device may be a MOSFET transistor or a bipolar transistor.

The low-side power supply line may include a low-side impedance for sensing the low-side current, and a low-side transistor device controlled by the low-side current control circuitry.

In accordance with another aspect of the disclosure, a PoE system comprises a PSE for providing power to a PoE port. A low-side power supply line is provided between the PoE port and a more negative power supply lead of a pair of leads for providing power supply to the PSE. A high-side power supply line is provided between the PoE port and a more positive power supply lead of the pair of power supply leads. Low-side current control circuitry is coupled to the low-side power supply line for controlling low-side current in the low-side power supply line, and high-side current control circuitry is coupled to the high-side power supply line for controlling high-side current in the high-side power supply line.

The high-side current control circuitry may include a high-side current limiting circuit for limiting the high-side current to a prescribed maximum current of the PSE at a short circuit condition, and/or a high-side circuit breaker for disconnecting the more positive power supply lead from the PoE port when the high-side current exceeds a prescribed overload current detection range.

The low-side side current control circuitry may include a low-side current limiting circuit for limiting the low-side current to the prescribed maximum current of the PSE at a short circuit condition, and/or a low-side circuit breaker for disconnecting the more negative power supply lead from the output port when the low-side current exceeds the prescribed overload current detection range.

A method of the present disclosure includes the following steps carried out to provide power over a communication link:

controlling by first current control circuitry, first current flowing between an output power supply port and a first lead of a pair of power supply leads, in accordance with prescribed conditions, and controlling by second current control circuitry, second current flowing between the output power supply port and a second lead of the pair of power supply leads, if the first current control circuitry fails.

The step of controlling the second current includes limiting the second current to a first prescribed value, and/or disconnecting the second lead from the output power supply port when the second current exceeds a second prescribed value.

In accordance with a further aspect of the disclosure, a local area network comprises at least a pair of network nodes, a network hub, and communication cabling for connecting the network nodes to the network hub to provide data communications. The network hub includes:

a power supply device for providing power to an output port coupled to the communication cabling, a low-side power supply line provided between the output port and a more negative power supply lead of a pair of leads for supplying power to the power supply device, a high-side power supply line provided between the output port and a more positive power supply lead of the pair of leads, low-side current control circuitry coupled to the low-side power supply line for controlling low-side current in the low-side power supply line, and high-side current control circuitry coupled to the high-side power supply line for controlling high-side current in the high-side power supply line.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein.

DETAILED DISCLOSURE OF THE EMBODIMENTS

The present disclosure will be made using the example of a power supply device in a PoE system. It will become apparent, however, that the concepts described herein are applicable to any power supply system. For example, the system of the present disclosure may be provided in a local area network (LAN) having a plurality of nodes, a network hub and communication cabling connecting the nodes to the network hub for providing data communications. The network hub may include the power supply device having a current control mechanism combining high-side and low-side current control.

Figure 1:
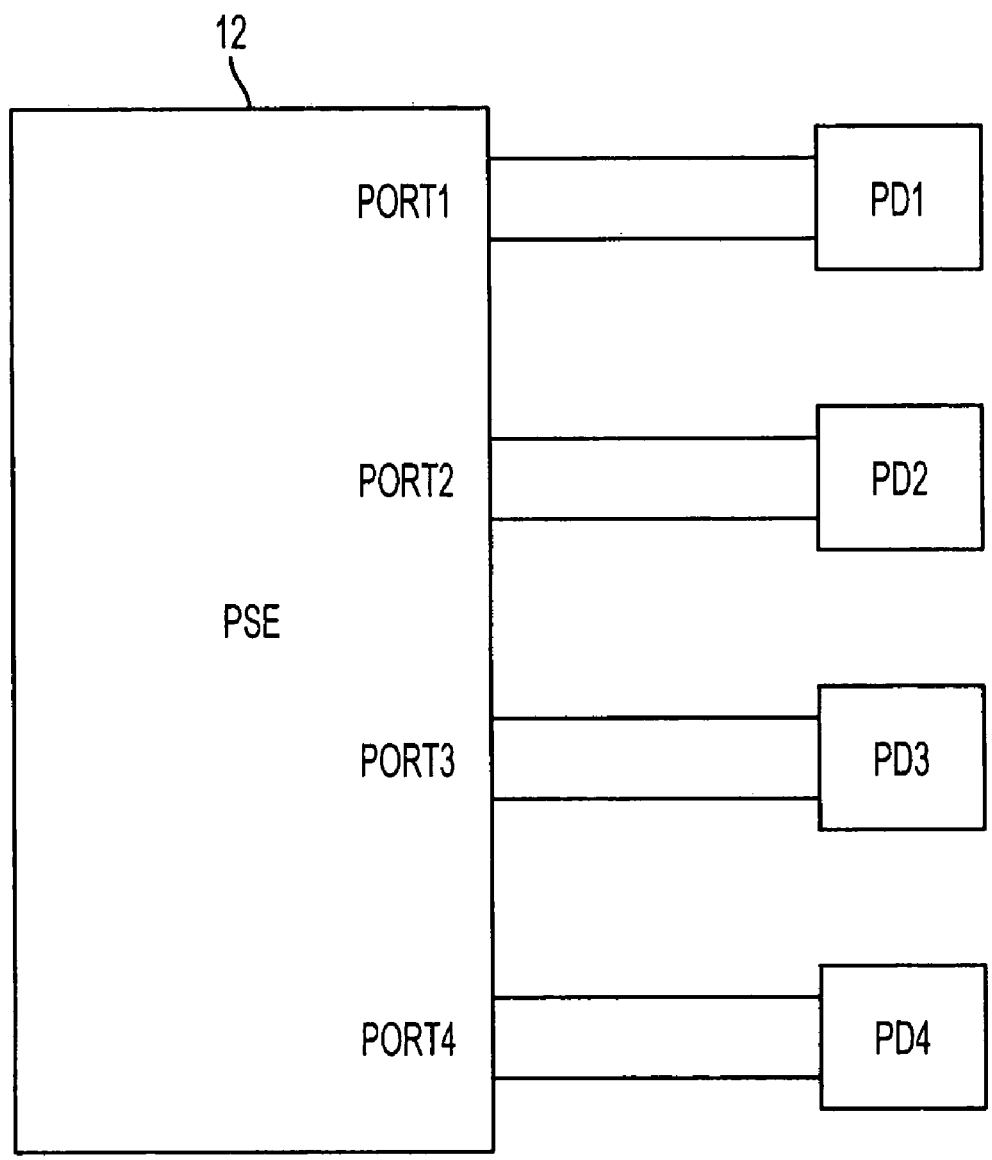
FIG. 1 is a diagram illustrating a PoE system of the present disclosure.

FIG. 1 shows a simplified block-diagram illustrating a Power over Ethernet (PoE) system 10 including Power Sourcing Equipment (PSE) 12 having multiple ports 1 to 4 connectable to Powered Devices (PD1 to PD4) via respective links, each of which may be provided using 2 or 4 sets of twisted pairs within an Ethernet cable. Although FIG. 1 shows four ports of the PSE 12, one skilled in the art would realize that any number of ports may be provided.

The PSE 12 may interact with each PD in accordance with the IEEE 802.3af standard. In particular, the PSE 12 and the PD participate in the PD detection procedure, during which the PSE 12 probes a link to detect the PD. If the PD is detected, the PSE 12 checks the PD detection signature to determine whether it is valid or non-valid. The valid and non-valid detection signatures are defined in the IEEE 802.3af standard. While the valid PD detection signature indicates that the PD is in a state where it will accept power, the non-valid PD detection signature indicates that the PD is in a state where it will not accept power.

If the signature is valid, the PD has an option of presenting a classification signature to the PSE to indicate how much power it will draw when powered up. For example, a PD may be classified as class 0 to class 4. Based on the determined class of the PD, the PSE applies the required power to the PD.

After the power is provided, the PSE 12 checks for overcurrent conditions by monitoring its output current with respect to certain current limit thresholds, such as the maximum output current of the PSE at a short circuit condition ($I_{LIM}$), and the overload current detection range ($I_{CUT}$).

In particular, the PSE 12 should be able to withstand without damage the application of short circuits of any wire to any other wire within a power supply cable, if the magnitude of the current through such a short circuit does not exceed $I_{LIM}$. Therefore, the PSE 12 may monitor its output current to prevent it from exceeding the $I_{LIM}$ level. For example, a value of $I_{LIM}$ may be maintained in the range between 400 mA and 450 mA.

Further, an overload condition may be detected when an output current of the PSE 12 exceeds $I_{CUT}$ for a time period exceeding an overload time limit ($T_{ovld}$). For example, the overload time limit $T_{ovld}$ may be set in the range between 50 ms and 75 ms. A value of $I_{CUT}$ may be kept at a level which is more than 15.4 W/$V_{Port}$ but less than 400 mA, where $V_{Port}$ is an output voltage of the PSE.

A conventional PSE has a low-side current control circuitry to control low-side current flowing in a low-side power supply line between a PSE port and a more negative lead of a pair of power supply leads. The low-side current control circuitry may prevent the low-side current from exceeding the $I_{LIM}$ level and/or may remove power from the port when the low-side current exceeds the $I_{CUT}$ value for a time period exceeding the $T_{ovld}$ time limit. To meet safety requirement, a fuse or positive temperature coefficient (PTC) device is conventionally used in a high-side power supply line between the PSE port and a more positive power supply lead of the pair of power supply leads, to protect against excessive current in the event of failure of the low-side current limiting.

The problem with this configuration is that over a large temperature range, the fusing current of the fuse or PTC device varies greatly. The fuse or PTC device must guarantee fusing at the current mandated by safety standards when the ambient temperature is very cold. The current that this device can reliably carry without fusing at a high ambient temperature is significantly less.

In high-power PoE systems, operating current levels should be increased. When the current levels are increased, the margin between the fuse current and the safe operating current is reduced to a point at which it is difficult to guarantee maintaining proper fuse operation over a large temperature range.

Figure 2:
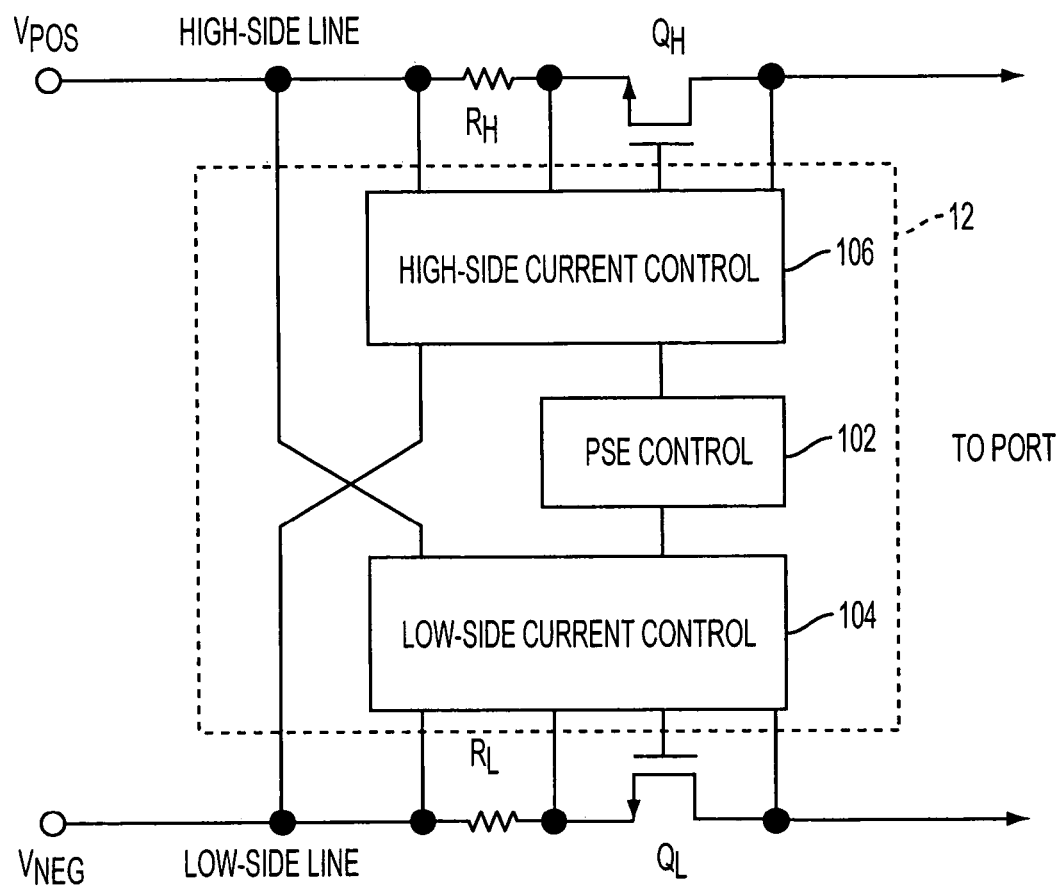
FIG. 2 is a diagram illustrating PSE arrangement having a current control mechanism of the present disclosure.

FIG. 2 illustrates an exemplary PSE arrangement having a current control mechanism that addresses this problem. A pair of leads for supplying power to the PSE 12 includes a more positive power supply lead Vpos and a more negative power supply lead Vneg. For example, the more positive power supply lead Vpos may be a ground lead, and the more negative power supply lead Vneg may be a −48V lead. A high-side power supply line is arranged between the Vpos lead and a PSE port, and a low-side power supply line is provided between the Vneg lead and the PSE port.

The PSE 12 comprises a PSE control circuit 102 for controlling PSE operations, a low-side current control circuit 104 for controlling low-side current flowing in the low-side power supply line, and a high-side current control circuit 106 for controlling high-side current flowing in the high-side power supply line. Operations of the low-side and high-side current control circuits 104 and 106 may be controlled by the PSE control circuit 102.

The low-side current control circuit 104 may determine low-side DC current flowing between the port and the more negative lead Vneg, by measuring voltage across a low-side sense resistor $R_L$ arranged in the low-side power supply line. The high-side current control circuit 106 may determine high-side DC current flowing between the port and the more positive lead Vpos, by measuring voltage across a high-side sense resistor $R_H$ arranged in the high-side power supply line. The high-side and low-side sense resistors $R_H$ and $R_L$ may be arranged externally with respect to the PSE chip. Alternatively, they may be provided on the PSE chip. One skilled in the art would realize that any impedance circuitry may be utilized instead of sense resistors $R_H$ and $R_L$. For example, diodes may be used.

A low-side transistor device $Q_L$ is arranged in the low-side power supply line for supporting current control operations of the low-side current control circuit 104. A high-side transistor device $Q_H$ is provided in the high-side power supply line for supporting current control operations of the high-side current control circuit 106. The high-side and low-side transistor devices $Q_H$ and $Q_L$ may be arranged externally with respect to the PSE chip. Alternatively, they may be provided on the PSE chip. Each of the transistor devices $Q_H$ and $Q_L$ may be implemented using a field-effect transistor or a bipolar transistor.

The low-side current control circuit 104 may limit the low-side current to a prescribed value and/or disconnect the more negative lead Vneg from the port if the low-side current exceeds a prescribed value. For example, the low-side current control circuit 104 may prevent the low-side current from exceeding a prescribed maximum output current of the PSE at a short circuit condition $I_{LIM}$. Further, the low-side current control circuit may remove power from the port when the low-side current exceeds a prescribed overload current detection range $I_{CUT}$ for a time period exceeding a prescribed overload time limit $T_{ovld}$.

In particular, the low-side current control circuit 104 may monitor sense voltage $V_L$ across the low-side sense resistor $R_L$, and compare the sense voltage $V_L$ with a reference voltage corresponding to a prescribed voltage $V_{LIM} = I_{LIM} \times R_L$, where $R_L$ is resistance of the low-side sense resistor $R_L$. As the sense voltage $V_L$ increasing with an increase in the low-side current approaches $V_{LIM}$, the low-side current control circuit 104 responds by decreasing voltage at the gate of the MOSFET transistor $Q_L$. Reducing the voltage at the gate of $Q_L$ will result in an increase of the transistor's resistance, which will in turn reduce the low-side current. Hence, the low-side current control circuit may limit the low-side current to a prescribed current limit $I_{LIM}$.

Further, the low-side current control circuit 104 may compare the sense voltage $V_L$ with a prescribed voltage $V_{CUT} = I_{CUT} \times R_L$. When the low-side current control circuit 104 detects that the sense voltage $V_L$ exceeds the $V_{CUT}$ value, it may trigger a timer programmed to count a value corresponding to a prescribed overload time limit $T_{ovld}$. If the voltage $V_L$ still exceeds the $V_{CUT}$ value when the time interval counted by the timer expires, the low-side current control circuit may turn off the transistor $Q_L$ to disconnect the more negative lead Vneg from the port. Hence, the low-side current control circuit may act as a circuit breaker when the low-side current exceeds a prescribed value $I_{CUT}$.

Similarly to operations of the low-side current control circuit 104, the high-side current control circuit 106 may limit the high-side current to a prescribed value and/or disconnect the more positive lead Vpos from the port if the high-side current exceeds a prescribed value. For example, the high-side current control circuit 104 may prevent the low-side current from exceeding a prescribed maximum output current of the PSE at a short circuit condition $I_{LIM}$. Further, the high-side current control circuit may remove power from the port when the low-side current exceeds a prescribed overload current detection range $I_{CUT}$ for a time period exceeding a prescribed overload time limit $T_{ovld}$. The values of $I_{LIM}$, $I_{CUT}$ and $T_{ovld}$ for the high side current may differ from the respective values for the low-side current. Alternatively, this values may coincide for the high-side and low-side currents.

The high-side current control circuit 106 may monitor sense voltage $V_H$ across the high-side sense resistor $R_H$, and compare the sense voltage $V_H$ with a reference voltage corresponding to a prescribed voltage $V_{LIM} = I_{LIM} \times R_H$, where $R_H$ is resistance of the high-side sense resistor $R_H$. The resistance of the high-side sense resistor $R_H$ may coincide with the resistance of the low-side sense resistor $R_L$. Alternatively, values of $R_H$ and $R_L$ may be different.

When the sense voltage $V_H$ approaches $V_{LIM}$, the high-side current control circuit 106 decreases voltage at the gate of the transistor $Q_H$ to increase the resistance of $Q_H$. As a result, the high-side current is limited to a prescribed current limit $I_{LIM}$.

Further, the high-side current control circuit 106 may compare the sense voltage $V_H$ with a prescribed voltage $V_{CUT}=I_{CUT}\times R_H$. When the sense voltage $V_H$ exceeds the $V_{CUT}$ value, the high-side current control circuit 106 may trigger a timer programmed to count a value corresponding to a prescribed overload time limit $T_{ovld}$. If the voltage $V_H$ still exceeds the $V_{CUT}$ value when the time interval counted by the timer expires, the high-side current control circuit 106 may turn off the transistor $Q_H$ to disconnect the more positive lead Vpos from the port. Accordingly, the high-side current control circuit 106 acts as a circuit breaker when the high-side current exceeds a prescribed value $I_{CUT}$.

In the event that one of the current control circuits 104 or 106 is shorted or otherwise inoperable, the other current control circuit will still be able to limit the port current to a prescribed value such as $I_{LIM}$, and/or remove the power from the port if the port current exceeds a prescribed value such as $I_{CUT}$. The temperature coefficient of the current control circuit 104 or 106 is much better than that of a fuse or positive temperature coefficient (PTC) device. Therefore, the trip point is more accurate. As a result, the PSE 12 provided with a combination of high-side and low-side current control can handle operating currents much higher than operating currents produced in a conventional PoE system.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art.

The embodiments described hereinabove are further intended to explain best modes known of practicing the invention and to enable others skilled in the art to utilize the invention in such, or other, embodiments and with the various modifications required by the particular applications or uses of the invention.

Accordingly, the description is not intended to limit the invention to the form disclosed herein. Also, it is intended that the appended claims be construed to include alternative embodiments.

What is claimed is:

1. A system for supplying power over a communication link, comprising:
   a power supply device for delivering power to an output port coupled to the communication link,
   a low-side power supply line provided between the output port and a more negative power supply lead of a pair of leads for supplying power to the power supply device,
   a high-side power supply line provided between the output port and a more positive power supply lead of the pair of leads,
   low-side current control circuitry coupled to the low-side power supply line for controlling low-side current in the low-side power supply line when the low-side current exceeds a first prescribed value, and
   high-side current control circuitry coupled to the high-side power supply line for controlling high-side current in the high-side power supply line when the high-side current exceeds a second prescribed value.

2. The system of claim 1, wherein the communication link includes an Ethernet link.

3. The system of claim 1, wherein the high-side current control circuitry includes a high-side current limiting circuit for limiting the high-side current to a first prescribed value.

4. The system of claim 1, wherein the high-side current control circuitry includes a high-side circuit breaker for disconnecting the more positive power supply lead from the output port in response to an event.

5. The system of claim 4, wherein the high-side circuit breaker is configured to disconnect the more positive power supply lead from the output port when the high-side current exceeds a second prescribed value.

6. The system of claim 3, wherein the low-side side current control circuitry includes a low-side current limiting circuit for limiting the low-side current to the first prescribed value.

7. The system of claim 5, wherein the low-side current control circuitry includes a low-side circuit breaker for disconnecting the more negative power supply lead from the output port when the low-side current exceeds the second prescribed value.

8. The system of claim 1, wherein the high-side power supply line includes a high-side impedance for sensing the high-side current.

9. The system of claim 8, wherein the low-side power supply line includes a low-side impedance for sensing the low-side current.

10. The system of claim 1, wherein the high-side power supply line includes a high-side transistor device controlled by the high-side current control circuitry.

11. The system of claim 10, wherein the transistor device includes a MOSFET transistor.

12. The system of claim 10, wherein the low-side power supply line includes a low-side transistor device controlled by the low-side current control circuitry.

13. A Power over Ethernet (PoE) system comprising:
   Power Sourcing Equipment (PSE) for providing power to a PoE port,
   a low-side power supply line provided between the PoE port and a more negative power supply lead of a pair of leads for supplying power to the PSE,
   a high-side power supply line provided between the PoE port and a more positive power supply lead of the pair of the leads,
   low-side current control circuitry coupled to the low-side power supply line for controlling low-side current in the low-side power supply line when the low-side current exceeds a first prescribed value, and
   high-side current control circuitry coupled to the high-side power supply line for controlling high-side current in the high-side power supply line when the high-side current exceeds a second prescribed value.

14. The system of claim 13, wherein the high-side current control circuitry includes a high-side current limiting circuit for limiting the high-side current to a prescribed maximum current of the PSE at a short circuit condition.

15. The system of claim 13, wherein the high-side current control circuitry includes a high-side circuit breaker for disconnecting the more positive power supply lead from the PoE port when the high-side current exceeds a prescribed overload current detection range.

16. The system of claim 14, wherein the low-side side current control circuitry includes a low-side current limiting circuit for limiting the low-side current to the prescribed maximum current of the PSE at a short circuit condition.

17. The system of claim 15, wherein the low-side current control circuitry includes a low-side circuit breaker for disconnecting the more negative power supply lead from the output port when the low-side current exceeds the prescribed overload current detection range.

18. A method of providing power over a communication link, comprising:

controlling by first current control circuitry, first current flowing between an output power supply port and a first lead of a pair of power supply leads, in accordance with prescribed conditions, and controlling by second current control circuitry, second current flowing between the output power supply port and a second lead of the pair of power supply leads, if the first current control circuitry fails.

19. The method of claim 18, wherein the step of controlling the second current includes limiting the second current to a first prescribed value.

20. The method of claim 18, wherein the step of controlling the second current includes disconnecting the second lead from the output power supply port when the second current exceeds a second prescribed value.

21. A local area network comprising:

at least a pair of network nodes, a network hub, and communication cabling for connecting the network nodes to the network hub to provide data communications, the network hub including:

a power supply device for providing power to an output port coupled to the communication cabling, a low-side power supply line provided between the output port and a more negative power supply lead of a pair of leads for supplying power to the power supply device, a high-side power supply line provided between the output port and a more positive power supply lead of the pair of leads, low-side current control circuitry coupled to the low-side power supply line for controlling low-side current in the low-side power supply line if the low-side current exceeds a first prescribed value, and high-side current control circuitry coupled to the high-side power supply line for controlling high-side current in the high-side power supply line if the high-side current exceeds a second prescribed value.

22. The system of claim 1, wherein the first prescribed value coincides with the second prescribed value.

23. The system of claim 1, wherein the first prescribed value differs from the second prescribed value.

* * * * *